Patented Apr. 10, 1945

2,373,446

UNITED STATES PATENT OFFICE 2,373,446

PREPARATION OF BUBBLE-FREE SOLID BODIES FROM POLYMERIZABLE SIRUPS

Daniel H. Beaton, Arlington, N. J., assignor to E. I. du Pont de Nemours & Company, Wilmington, Del., a corporation of Delaware No Drawing. Application April 1, 1942,
Serial No. 437,274

4 Claims. (Cl. 260—83)

This invention relates to a process of preparing bubble-free solid bodies and, more particularly, to the preparation of such flawless solid bodies from sirups of acrylic and methacrylic esters.

Sheets of acrylic and methacrylic acid ester polymers are usually formed by polymerizing a sirup of the monomer containing dissolved polymer and catalyst, in a cell consisting of two glass plates separated by a flexible gasket. The conditions of polymerization are carefully controlled to yield a product as nearly perfect as possible. Nevertheless, despite all precautions, the percentage of sheets bearing bubbles and voids has, up to the time of the present invention, been large.

It is an object of this invention to provide an improved process for forming solid bodies from sirups of acrylic and methacrylic acid esters. More particularly, it is an object to prepare bubble-free sheets or blocks by polymerizing in a suitable mold a sirup of methyl methacrylate monomer containing dissolved polymer. Other objects will be apparent from the description of the invention given hereinafter.

The above objects are accomplished according to the present invention by intimately contacting substantially the whole of a quantity of an acrylic or methacrylic acid ester sirup with carbon dioxide gas and thereafter subjecting said sirup to polymerizing conditions to convert it to a solid body. More specifically, a container is partially filled with a sirup of methyl methacrylate polymer dissolved in methyl methacrylate monomer, carbon dioxide gas is introduced into the container thereby displacing the air above the surface of the sirup, the container is covered and then vigorously shaken. The sirup is allowed to stand undisturbed until the bubbles have risen to the surface after which it is poured into a suitable mold and subjected to polymerizing conditions in the conventional manner.

The present invention resides in the discovery of the unique effect of carbon dioxide gas when brought into intimate contact with these sirups used for making solid bodies or so-called "turnery" shapes. While a sirup of an acrylate or methacrylate when subjected to polymerizing conditions to form a solid body may give a cast article containing numerous small bubbles or voids, it has been found that the same sirup, polymerized under identical conditions will, if first subjected to intimate contact with carbon dioxide gas, give a cast article entirely free of such bubbles or voids.

The following example illustrates a specific embodiment of the invention:

*Example I*

Two liters of a sirup of methyl methacrylate, formed by partially polymerizing the monomer, having a viscosity of 700 centipoises at 15° C. and containing 0.2% benzoyl peroxide as catalyst, were run into a four-liter glass bottle. Carbon dioxide gas was added for one minute through a glass tube extending just inside the container, following which the tube was withdrawn and a sheet of regenerated cellulose fastened tightly over the mouth of the bottle. The bottle was shaken vigorously for thirty seconds and was then allowed to stand undisturbed for five minutes, at the end of which time bubbles had ceased to rise to the surface from within the liquid.

Some of the treated sirup was used to fill a cell formed by two glass plates separated by a flexible gasket and defining a cavity having approximately the dimensions 32" x 58" x 0.146". The cell and its contents were maintained in an oven at 120° F. for 10 hours. It was then removed, cooled and dismantled. The resin sheet thus formed was approximately 58 inches long and 32 inches wide, and had a caliper of 0.125 inch. It was perfectly smooth, and free from bubbles and voids.

Methyl methacrylate sirup identical with that used above was polymerized under identical conditions except that no carbon dioxide gas was brought into intimate contact with the sirup. The resulting sheet was similar to that made above but contained many small bubbles or voids.

It will be understood that the above example is merely illustrative and that the invention broadly comprises bringing the sirup into intimate contact with carbon dioxide gas regardless of the specific manner in which it is done.

The gas may be led in through a tube terminating above the surface of the liquid or passed directly into the liquid itself and allowed to bubble to the surface. Active agitation by means of a suitable mechanical device, such as a propeller or a paddle wheel, may be substituted for shaking.

No harm results if the freshly treated sirup containing bubbles is poured directly into the mold and the bubbles there permitted to rise. If desired, the region above the surface of the liquid may be partially evacuated to hasten the removal of bubbles.

A further variation consists in introducing the carbon dioxide gas near the bottom of the container through a sintered glass gas dispersion plate of relatively large area. It has been found that when this practice is followed, satisfactory results are obtained without additional agitation.

although the use of agitation is not, of course, precluded.

Whatever the precise procedure employed, substantially the whole of the body of acrylic or methacrylic ester sirup must be brought into intimate contact with carbon dioxide prior to polymerization. The mere blanketing of the surface with the gas is insufficient to accomplish the results here contemplated, as is also the introduction of the gas into the sirup from the open end of a glass tube in the absence of vigorous agitation.

It is not necessary that the sirup be subjected to polymerizing conditions immediately after being brought into contact with the carbon dioxide gas but if allowed to stand around for a prolonged period in a container open to the atmosphere subsequent to this treatment, results are not satisfactory. Normally the sirup, if not to be used immediately, should be kept in a closed container subsequent to the time it has been treated so that the sirup is not allowed to be in contact with the air.

The invention is broadly applicable to "casting" sirups of acrylic and methacrylic acids generally, the selection of the particular ester or mixture of esters being primarily dictated by considerations other than the operativeness of the present invention. The sirup may be formed by dissolving pre-formed polymer in monomer, or by partially polymerizing monomer.

Methyl methacrylate is widely used in these "casting" sirups but other esters such as the ethyl, propyl, and butyl esters of methacrylic and acrylic acids are used at times, depending upon the properties desired in the finished product. Also, the polymeric component of the sirup may be one ester and the monomeric component a different ester. Further, the polymeric compound may be a mixture or a copolymer of two or more esters and the monomeric component may be a mixture of two or more esters. Acrylic or methacrylic acids or anhydrides may be components of the sirups and add valuable properties to the resulting polymerized products for special uses. Other polymerizable compounds used in the manufacture of synthetic resins for casting "turnery" shapes may also be used in minor proportions such as styrene, vinyl esters, and the like. Ordinarily a polymeric component soluble in a monomeric component will be used but in some cases an insoluble polymeric component is deliberately used to achieve some specific effect.

Those skilled in the art will appreciate that catalysts, inhibitors, plasticizers, special modifiers, and effect materials, and the like, may be added to the sirup as heretofore done without affecting the operation of the present invention. While the invention is primarily directed to forming water-white transparent bodies, it is also applicable to dyed or pigmented compositions.

While the invention applies to forming objects of all kinds by polymerizing an acrylic or methacrylic acid ester sirup in a mold, its advantages are especially evident in the production of sheets of high optical quality, in which the final finish is derived from the mold itself. Occasional bubbles in so-called turnery shapes, intended for subsequent machining, may sometimes be removed in tooling operations, or at least so located as to be inconspicuous in the finished product. Voids which open to the exterior may be filled with monomer or sirup, which is subsequently polymerized in situ and smoothed to conform to the adjoining surface. None of these practices, however, yields a product of optimum optical properties. There is no known method of duplicating the original high polish of a surface obtained by polymerizing methyl methacrylate in contact with plate glass.

As many apparently widely different embodiments of this invention may be made without departing from the spirit and scope thereof, it is to be understood that the invention is not limited to the specific embodiments thereof except as defined in the appended claims.

I claim:

1. Process of preparing bubble-free solid bodies from a sirup of a polymer from the group consisting of the esters of acrylic and methacrylic acids, dissolved in a monomer from the group consisting of the esters of acrylic and methacrylic acids, which process comprises intimately intermixing carbon dioxide gas with a quantity of said sirup throughout substantially the whole mass of said sirup and in the absence of air and thereafter subjecting said sirup to polymerizing conditions to convert it to a solid body.

2. Process of preparing bubble-free solid bodies from a sirup of a polymer from the group consisting of the esters of acrylic and methacrylic acids, dissolved in a monomer from the group consisting of the esters of acrylic and methacrylic acids, which process comprises partially filling a container with said sirup, displacing the air in said container with carbon dioxide gas, vigorously agitating the contents of said container to bring said sirup into intimate contact with said carbon dioxide gas and thereafter disposing said sirup in a mold and subjecting said sirup to polymerizing conditions to convert said sirup to a solid body.

3. Process of preparing bubble-free solid bodies from a sirup of methyl methacrylate polymer dissolved in methyl methacrylate monomer, which process comprises intimately intermixing carbon dioxide gas with a quantity of said sirup throughout substantially the whole mass of said sirup and in the absence of air and thereafter subjecting said sirup to polymerizing conditions to convert it to a solid body.

4. Process of preparing bubble-free solid bodies from a sirup of methyl methacrylate polymer dissolved in methyl methacrylate monomer, which process comprises partially filling a container with said sirup, displacing the air in said container with carbon dioxide gas, vigorously agitating the contents of said container to bring said sirup into intimate contact with said carbon dioxide gas and thereafter disposing said sirup in a mold and subjecting said sirup to polymerizing conditions to convert said sirup to a solid body.

DANIEL H. BEATON.